United States Patent
Kuckelkorn (10) Patent No.: US 10,184,691 B2
(45) Date of Patent: Jan. 22, 2019

(54) ABSORBER AND RETAINING DEVICE FOR ABSORBER TUBES

(71) Applicant: RIOGLASS SOLAR HOLDING, S.A., Asturias (ES)

(72) Inventor: Thomas Kuckelkorn, Jena (DE)

(73) Assignee: RIOGLASS SOLAR HOLDING, S.A., Asturias (ES)

( * ) Notice: Subject to any disclaimer, the term of this patent is extended or adjusted under 35 U.S.C. 154(b) by 496 days.

(21) Appl. No.: 14/809,394

(22) Filed: Jul. 27, 2015

(65) Prior Publication Data

US 2016/0010894 A1    Jan. 14, 2016

Related U.S. Application Data

(63) Continuation of application No. PCT/EP2014/051587, filed on Jan. 28, 2014.

(30) Foreign Application Priority Data

Jan. 29, 2013   (DE) .................... 10 2013 201 409

(51) Int. Cl.
*F24S 80/00*    (2018.01)
*F24S 10/40*    (2018.01)
(Continued)

(52) U.S. Cl.
CPC ............... *F24S 10/45* (2018.05); *F24S 23/71* (2018.05); *F24S 23/74* (2018.05); *F24S 25/00* (2018.05);
(Continued)

(58) Field of Classification Search
CPC ........ F24J 2/055; F24J 2/14; F24J 2/52; F24J 2/12; F24J 2/46; F24J 2/51; F24J 2/5201;
(Continued)

(56) References Cited

U.S. PATENT DOCUMENTS 3,113,790 A    12/1963    Matthiessen
5,312,137 A    5/1994    Nee
(Continued)

FOREIGN PATENT DOCUMENTS

CN    102483264    5/2012
DE    10231467 B4    5/2004
(Continued)

OTHER PUBLICATIONS

English translation of the International Search Report dated Apr. 24, 2014 for corresponding PCT/EP2014/051587, 3 pages.
(Continued)

*Primary Examiner* — Alfred Basichas
(74) *Attorney, Agent, or Firm* — Ohlandt, Greeley, Ruggiero & Perle, L.L.P.

(57) ABSTRACT

A retaining device for absorber tubes that have a metal tube and a glass cladding tube is provided. The retaining device includes a tube clamp made of two tube clamp halves, which have a main part with a retaining feature. The tube clamp surrounds the metal tube in the mounted state, and the retaining feature rests against the exterior of the metal tube. A thermal radiation shield is arranged on the interior of the main part of the tube clamp in order to reduce the loss of heat at the ends of the metal tube of the absorber tube.

23 Claims, 9 Drawing Sheets

(51) Int. Cl.
  *F24S 80/60* (2018.01)
  *F24S 25/00* (2018.01)
  *F24S 25/60* (2018.01)
  *F24S 23/71* (2018.01)
  *F24S 23/74* (2018.01)
  *F24S 20/20* (2018.01)

(52) U.S. Cl.
  CPC .............. *F24S 25/60* (2018.05); *F24S 80/00* (2018.05); *F24S 80/60* (2018.05); *F24S 20/20* (2018.05); *F24S 2025/6003* (2018.05); *Y02E 10/44* (2013.01); *Y02E 10/45* (2013.01); *Y02E 10/47* (2013.01)

(58) Field of Classification Search
  CPC ...... F24J 2/5243; F24J 2/07; F24J 2002/4663; Y02E 10/44; Y02E 10/45; Y02E 10/47
  See application file for complete search history.

(56) References Cited

U.S. PATENT DOCUMENTS

| | | |
|---|---|---|
| 6,705,311 B1 | 3/2004 | Schwartzman et al. |
| 2004/0050381 A1 | 3/2004 | Kuckelkorn et al. |
| 2005/0139210 A1 | 6/2005 | Eickhoff |
| 2010/0300431 A1 | 12/2010 | Carrascosa Lopez et al. |
| 2011/0073104 A1* | 3/2011 | Dopp ................. F24J 2/055 126/651 |
| 2011/0168161 A1 | 7/2011 | Capan |

FOREIGN PATENT DOCUMENTS

| | | |
|---|---|---|
| DE | 10258828 A1 | 7/2004 |
| DE | 60223711 T2 | 10/2008 |
| DE | 102007000487 A1 | 3/2009 |
| EP | 1690047 B1 | 8/2006 |
| WO | 03/019069 A1 | 3/2003 |
| WO | 2009146215 A2 | 12/2009 |
| WO | 2010142666 A2 | 12/2010 |

OTHER PUBLICATIONS

English translation of the International Report on Patentability dated Jul. 30, 2015 for corresponding PCT/EP2014/051587, 5 pages.

* cited by examiner

ABSORBER AND RETAINING DEVICE FOR ABSORBER TUBES

CROSS REFERENCE TO RELATED APPLICATIONS

This application is a continuation of International Application No. PCT/EP2014/051587 filed on Jan. 28, 2014, which claims the benefit under 35 U.S.C. § 119(a) of German Patent Application No. 10 2013 201 409.0 filed on Jan. 29, 2013, the entire contents of both of which are incorporated herein by reference.

BACKGROUND

1. Field of the Invention

The invention relates to a retaining device for absorber tubes. The invention also relates to an arrangement made up of absorber tubes and a retaining device.

2. Description of Related Art

Parabolic trough collectors in solar thermal power plants have parabolically curved mirrors, which can extend over a length of several hundred meters. Arranged in the focal line of these parabolic mirrors are absorber tubes, which have a metal tube and a cladding tube. Such absorber tubes are known from DE 102 31 467 B4, for example.

In order to reach the required length, it is necessary to join a plurality of absorber tubes together with one another. The metal tubes are welded together with one another for this purpose. Arranged in each junction is a retaining device, which, on the one hand, is fastened to the support structure of the parabolic trough collector and, on the other hand, engages with the absorber tubes.

Known from WO 2010/142666 A2 is such a retaining device, which has posts or supports that extend outward from the interior of the parabolic mirror and, at the upper end of which, is arranged a tube clamp that clasps the metal tube in its junction. This tube clamp has a main part made of two outward extending pieces of sheet metal spaced apart from each other, at which two tube clamp halves are arranged by means of a hook-like hinge so as to move without becoming detached. Situated at the free ends of the tube clamp halves is a screw bolt connection. Arranged on the inside of the tube clamp halves are projections, which rest against the metal tube. These point-like rest supports have the advantage that heat losses due to thermal conduction can be reduced. However the heat losses at the junction of the metal tube are still too large in spite of this measure.

Thermal shielding materials in the form of insulating materials, for example, to reduce heat losses at the open regions of the absorber tube have been used previously. However, the installation of a ribbon-type insulation material prior to mounting of the retaining clips has the drawback that the force fit between the retaining clip and the absorber tube is not ensured and that there is a risk that, owing to the tracking movement of the collector as well as owing to the longitudinal movement of the insulating material caused by thermal expansion of the absorber tube, the insulating material is pressed out of its original position and there is no longer a force fit of the retaining clips. Moreover, when the insulating material is permanently subject to penetration of moisture—for example, during prolonged periods of inclement weather—corrosion problems can arise at the weld seams of the metal tubes lying beneath the insulating material.

Such insulating materials generally have a reflectance of markedly less than 0.5, particularly for application in the infrared region at wavelengths greater than 3 μm. Reflectance is understood to mean the ratio of reflected intensity to incident intensity.

Known from EP 1 690 047 B1 is a solar collector, in which, in the junction of two absorber tubes, a radiation shielding element of length L is arranged, at the end of which a mirror collar is provided. The radiation shielding element has a larger radius of curvature than the glass cladding tube and covers the entire free space between the two cladding tubes of the absorber tubes. On account of the great distance of the radiation shielding element from the metal tubes, this arrangement has the drawback that a large amount of thermal radiation occurs from the metal tubes onto front-side components of the absorber tubes, such as, for example, the glass-metal transition elements, and heats them.

SUMMARY

The object of the invention is therefore to prevent the drawbacks of the prior art and further to reduce the thermal radiation losses at the ends of the metal tubes of absorber tubes.

This object is achieved by a retaining device according to the features disclosed herein.

It is provided that a thermal radiation shield is arranged on the inside of the main part of the tube clamp, said thermal radiation shield having a reflectance of 0.5 to 1.0 over the entire wavelength range from 0.5 μm to 30 μm.

The radiation of heat or thermal radiation is the electromagnetic radiation emitted by the metal tube owing to its temperature. The thermal radiation shield prevents the emission of thermal radiation from the metal tube into the surroundings of the absorber tube in that the thermal radiation element reflects the thermal radiation back onto the metal tube.

The reflectance of the thermal radiation shield preferably lies in the range of 0.7 to 1.00 and more preferably in the range of 0.8 to 1.00 for a wavelength range of 0.5 μm to 30 μm.

The mentioned reflectances apply preferably to the entire wavelength range from 1.0 μm to 30 μm, more preferably for the entire wavelength range from 2.0 μm to 30 μm.

The arrangement of the thermal radiation shield at the tube clamp has the advantage that the thermal radiation shield can be premounted at the tube clamp, thereby simplifying the mounting overall.

The inside of the main part of the tube clamp is understood to be the side that faces the metal tube of the absorber tube.

The heat losses at the tube ends of the metal tube are markedly reduced by means of the thermal radiation shield. This effect is enhanced at higher operating temperatures, such as, for example, those aimed at for the operation with fused salts as heat transfer media. In this process, both the temperatures in standby operation at 200° C. to 300° C. and the maximum operating temperatures of up to 550° C. are markedly higher than in present-day plants that are operated with oil as heat transfer medium and reach standby temperatures of 80° C. to 120° C. and maximum operating temperatures of 350° C. to 400° C. The heat losses could be reduced with the thermal radiation shield according to the invention by up to 20% in comparison to a retaining device that has no thermal radiation shield.

The thermal radiation shield is preferably made of stainless steel or aluminum or an aluminum alloy.

In order to increase the reflectance, in particular to values greater than 0.8, a reflective coating is of advantage. The coating is preferably composed of aluminum, copper, or silver or of an Al, Cu, or silver alloy.

The irradiated heat is kept away from the tube clamp, so that the latter is heated less strongly. The material of the tube clamp can thus be chosen largely independent of its thermal properties.

Owing to the arrangement of the thermal radiation shield in proximity to the metal tube, less heat is dissipated to the outer structural components of the absorber tube. As a result, the temperature difference and thus the thermally induced stress in the transition region between an expansion compensation device, for example, which can be a metal bellows, for example, and the glass cladding tube can be reduced and thereby the risk of fracture of the glass-metal transition element is reduced. The arrangement of the thermal radiation shield in proximity to the metal tube precludes any contact of the thermal radiation shield with the metal tube. Therefore, a spaced arrangement of the thermal radiation shield with respect to the metal tube is preferred.

Preferably, the thermal radiation shield extends over at least 50% of the inner circumference of the tube clamp. The inner circumference refers to the inside of the main part of the clamp. A coverage of 50% of the inner circumference can be sufficient when the surface area of the metal tube that faces the parabolic trough is shielded therewith.

The side of the absorber tube facing the parabolic trough heats up more strongly than does the side that faces the sun and thus also emits more heat. A substantial reduction in heat losses is therefore already achieved when the side that faces the parabolic trough is covered by the thermal radiation shield.

Preferably, the thermal radiation shield extends over the entire inner circumference of the tube clamp, because the heat losses can thereby be minimized even more markedly.

Preferably, the width $B_S$ of the thermal radiation shield is greater than the width $B_R$ of the tube clamp. Owing to the greater width of the thermal radiation shield, the tube clamp is better shielded from thermal radiation. Moreover, the heat losses are reduced with increasing width.

The thermal radiation shield preferably covers the entire free region of the metal tube, that is, the region that is not vacuum-insulated by the glass cladding tube.

The thermal radiation shield preferably has a one-part design or a multipart design. For example, the thermal radiation shield can be composed of one or a plurality of metal strips. In comparison to the one-part embodiment, the multipart design of the thermal radiation shield has the advantage that the thermal radiation shield can be mounted more easily.

The thermal radiation shield can have a multilayer design or can be composed of a multilayer material in order to enhance the thermal shielding effect.

A multilayer arrangement of films or foils, such as, for example, Al foils, is suitable for this purpose.

Preferably, the thermal radiation shield is arranged at a distance with respect to the main part of the tube clamp. This distanced arrangement has the advantage that the thermal radiation shield, apart from its contact with the retaining means, has no contact with the tube clamp, so that thermal conduction largely cannot occur and hence heat losses can be minimized.

Preferably, the thermal radiation shield has openings, by means of which the retaining means engage.

Inasmuch as the retaining means preferably engage through the openings, the thermal radiation shield is arranged in a recessed manner with respect to the contact faces of the retaining means, which rest against the metal tubes in the mounted state. As a result, a spaced arrangement of the thermal radiation shield relative to the metal tubes is brought about.

Preferably, the retaining means also serve for fixing the thermal radiation shield in place. Preferably, the dimensions of the openings are adapted to the dimensions of the retaining means so that any relative movement of the tube clamp and the thermal radiation shield is prevented.

Preferably, the thermal radiation shield is composed of at least one curved metal strip. Metal strips can be cut to size and shaped in large numbers in a simple way, so that a large number of thermal radiation shields can be manufactured in an inexpensive way.

Preferably, the main part of the tube clamp is made of solid material. Preferably steel, in particular stainless steel, is utilized as the solid material. Solid material has the advantage that very stable main parts can be fabricated from it and then can be easily joined structurally to the retaining elements. For example, blind holes can be made laterally at the ends of the main part, in which bolts for fastening to the retaining elements can then be introduced.

Preferably, the retaining means of the tube clamp are contact jaws. These contact jaws can be molded on the main part of the tube clamp. These contact jaws are preferably provided with a flat contact face, so that it is possible to achieve a point-like or linear contact on the round metal tube. A point-like or linear contact has the advantage that the thermal conduction of the metal tube into the tube clamp is minimized.

According to another embodiment, the main part of the tube clamp can be fabricated in a so-called frame construction manner. This means that the tube clamp halves exhibit a kind of framework design, which provides a low weight.

Preferably, the main part of a tube clamp half is fabricated from at least two cut-out metal segments, which are arranged adjacent to one another in the axial direction of the tube clamp and are joined to each other by way of connection means. The axis of the tube clamp corresponds to the axis of the metal tube. These connection means are preferably arranged at the points where the tube clamp halves are joined together by means of screw bolts. The connection means are therefore metal elements, which preferably have a bored hole to accommodate the connection screw bolts.

The retaining means of the metal strip blanks are preferably formed by support segments, which have a flat contact face.

The object is also achieved by means of an arrangement made up of two absorber tubes and a retaining device.

The arrangement has two absorber tubes, each of which has a metal tube and a glass cladding tube, with the metal tubes being joined to each other and a gap existing between the adjacent glass cladding tubes. Moreover, the arrangement comprises a retaining device, which engages the joined metal tubes in the gap, and a tube clamp having a main part, with a thermal radiation shield being arranged on the inside of the main part of the tube clamp, said thermal radiation shield having a reflectance of 0.5 to 1.0 over the entire wavelength range of 0.5 µm to 30 µm.

The gap between the glass cladding tubes is defined, depending on the construction design of the absorber tubes, by the arrangement of fastening elements for the glass cladding tubes on the metal tubes.

Preferably, the thermal radiation shield has a radius of curvature $R_W$ that is smaller than the radius of curvature $R_G$ of the glass cladding tube. The thermal radiation of the metal tube is prevented by the thermal radiation shield from contacting the front-side components of the absorber tube and heating these.

Preferably, the radius of curvature $R_W$ is larger than the radius of curvature $R_M$ of the metal tube. The radius of curvature $R_W$ thus preferably lies between $R_M$ and $R_G$. Preferably, the following relation holds: $1.1 \times R_M \leq R_W \leq 1.3 \times R_M$. When the thermal radiation shield has radii of curvature in this range, it is arranged as tightly on the metal tube as possible, but nonetheless still at a distance from metal tube.

Preferably, the thermal radiation shield is arranged at a distance from the metal tubes. This distanced arrangement has the advantage that no thermal conduction from the metal tube to the thermal radiation shield can take place and that the gap between the metal tubes and the thermal radiation shield still remains ventilated, so that no moisture can collect there.

Preferably, the width $B_S$ of the thermal radiation shield is chosen such that the gap between the two glass cladding tubes or the fastening elements of the glass cladding tubes is bridged. The exposed ends of the metal tube are covered.

Preferably, the thermal radiation shield is designed to be reflecting on the side facing the metal tubes. A reflective coating can also be provided for this purpose.

Preferably, the absorber tube has an expansion compensation device, such as, for example, a bellows, between the metal tube and the glass cladding tube, said bellows, on the one hand, being joined by means of a fastening element to the metal tube and, on the other hand, being joined by means of another fastening element to the glass cladding tube. In order to safeguard the transition and fastening to the glass cladding tube, the glass cladding tube has a so-called glass-metal transition element.

Depending on the arrangement of the expansion compensation device and the arrangement of the associated fastening elements, the gap between adjacent absorber tubes can be different in size. There also exists the possibility that, corresponding to the arrangement of the expansion compensation device, an annular space is present between a fastening element and the expansion compensation device, said annular space also being accessible from the gap.

When an annular space is present between the metal tube and the expansion compensation device or between the expansion compensation device and a fastening element, the thermal radiation shield preferably can also extend into these annular spaces of the two absorber tubes. As a result, an even better shielding and reduction of thermal radiation losses can be achieved.

The various embodiments of the retaining device also apply to the arrangement according to the invention.

BRIEF DESCRIPTION OF THE DRAWINGS

Preferred embodiments are described in detail below on the basis of drawings. Shown are.

DETAILED DESCRIPTION

Figure 1:
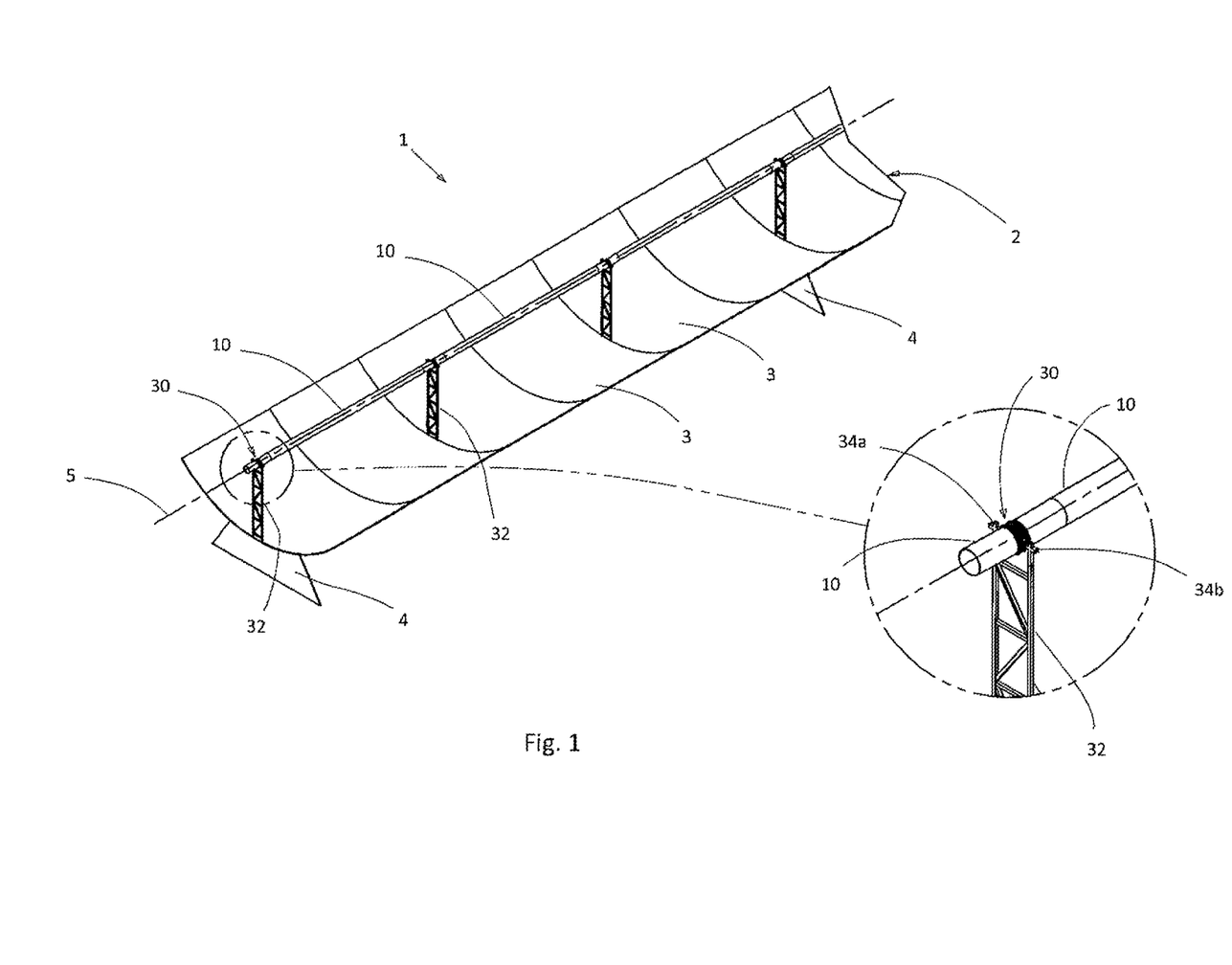
FIG. 1 a perspective illustration of a parabolic trough having absorber tubes that are joined to one another, FIG. 2 an exploded illustration of the junction of two absorber tubes having a retaining device, FIG. 3 a retaining device in the mounted state, FIG. 4 a section corresponding to the plane IV-IV through the retaining device shown in FIG. 3, FIG. 5a a section corresponding to the plane V-V through two absorber tubes joined to one another for highlighting the axial extension of the thermal radiation shield, FIG. 5b a section corresponding to FIG. 5a through another embodiment of the retaining device, FIG. 6 an exploded illustration of the retaining device according to another embodiment, FIGS. 7-8 another embodiment of the tube clamp, and FIG. 9 another embodiment of the thermal radiation shield.

Illustrated in a perspective drawing in FIG. 1 is a parabolic trough collector 1, which is part of a parabolic trough power plant. A parabolic trough 2 is formed by a large number of parabolic mirrors 3, which are joined to one another. The parabolic trough 2 is pivotally mounted on support posts 4, so that a tracking corresponding to the position of the sun is possible.

Absorber tubes 10, which have a metal tube 12 and a glass cladding tube 16, are arranged in the focal line 5 of the parabolic trough 2. The metal tubes 12 are each joined to one another at their ends 13a, b, in particular being welded to one another (see FIG. 2).

The glass cladding tube 16 of an absorber tube 10 is arranged in a recessed manner with respect to the two ends 13a, b of the metal tube 12, so that adjacent absorber tubes 10 form a gap 18 between the glass cladding tubes 16 (see FIG. 5a, b), in which a retaining device 30 can engage at the joined ends 13a, b of the metal tubes 12.

Each retaining device 30 is fastened to a support element 32, which extends through an opening (not depicted) in the parabolic mirrors 3 and is fastened to a (subconstruction that is not depicted) beneath the parabolic mirrors 3.

At their upper ends, the support elements 32 have two retaining elements 34a, b, to which the retaining device 30 is fastened.

Figure 2:
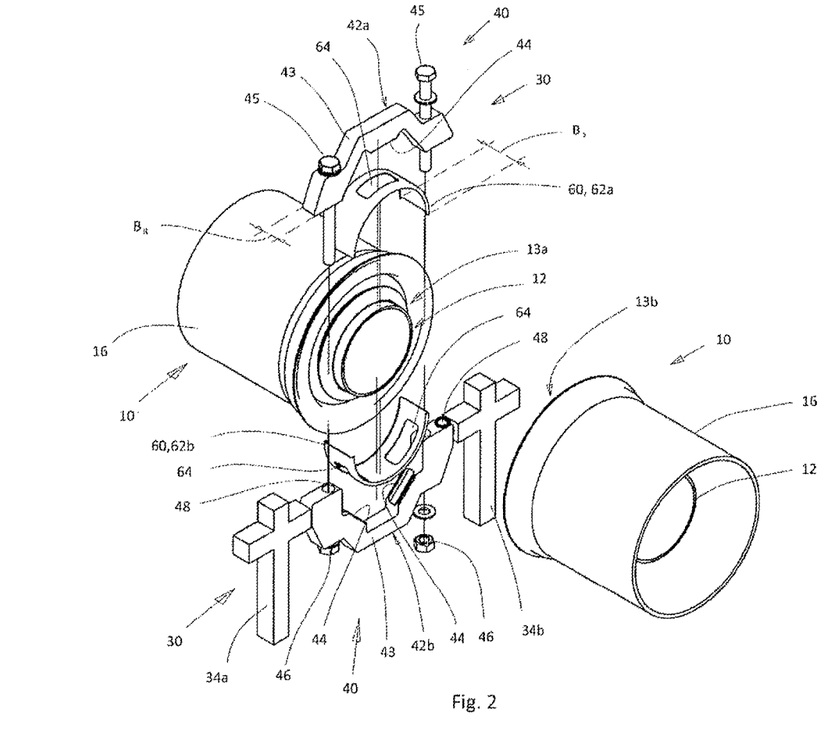

Shown in FIG. 2 in an exploded illustration is the retaining device 30. The ends 13a and 13b of the metal tubes 12 of the two absorber tubes 10 are not joined together for reasons of clarity and are illustrated at a distance with respect to each other. In FIG. 2, the retaining device 30 has a tube clamp 40, which is composed of two tube clamp halves 42a, b. The tube clamp halves 42a, b each have a main part 43, which is fabricated of solid material in the illustration shown here.

Bored holes 48 are provided at the ends of the tube clamp halves 42a, b and screw bolts 45 are inserted through them in order to join the tube clamp halves 42a, b together. Nuts 46 are screwed onto the screw bolts 45.

In the assembled state, the tube clamp 40 engages the ends 13a, b of the two metal tubes 12. The bottom tube clamp half 42b is fastened to the two retaining elements 34a, b of a support element 32 in a manner that is not illustrated in more detail.

On the inside of the tube clamp 40, that is, on the side of the tube clamp 40 that faces the metal tubes 12, retaining means 44 are arranged on the main part 43 and, in particular, molded on it, by means of which the tube clamp halves 42a, b rest against the metal tubes 12.

Moreover, a thermal radiation shield 60 is arranged on the inside of the tube clamp 40, said thermal radiation shield being composed of two thermal radiation shield halves 62a, b, which are not depicted here.

These thermal radiation shield halves 62a, b are each composed of a half-shell, which is fabricated from a metal or sheet metal strip. The upper thermal radiation shield half 62a has an opening 64 and the lower thermal radiation shield half 62b has two openings 64, through which the retaining means 44 engage.

The dimensions of the openings 64 are adapted to the dimensions of the retaining means 44, so that the halves 62a, b are fixed in place at the retaining means 44. Therefore, it is not necessary to join the two thermal radiation shield halves 62a, b, thereby simplifying mounting.

The width $B_S$ of the thermal radiation shields halves 62a, b is greater than the width $B_R$ of the tube clamp 40. The thermal radiation shield 60 extends over the entire inner periphery of the tube clamp 40.

Figure 5A:
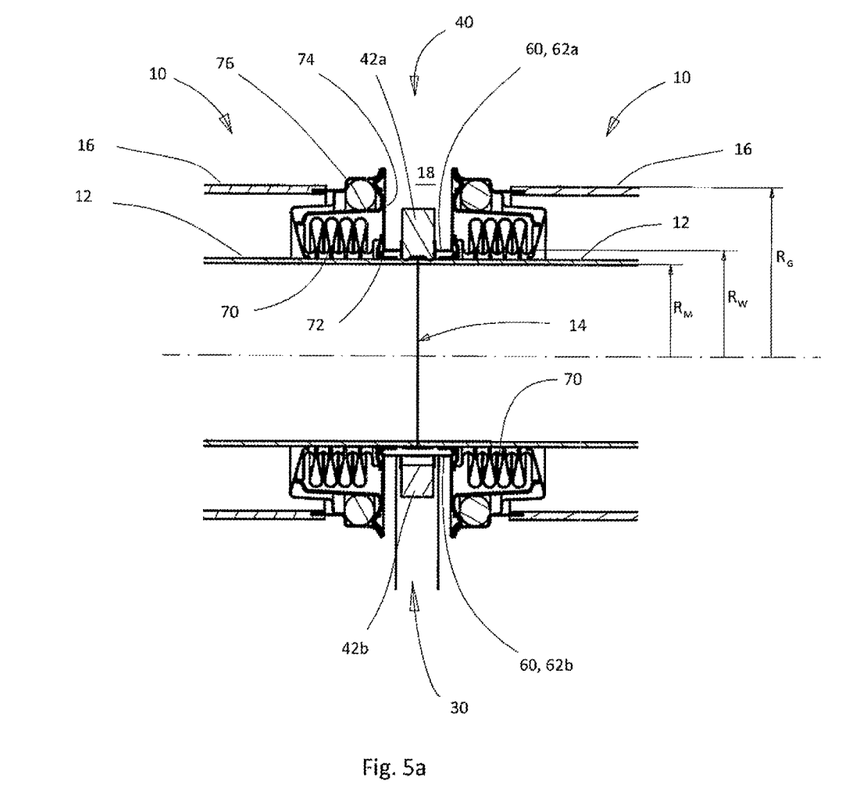
Figure 5B:
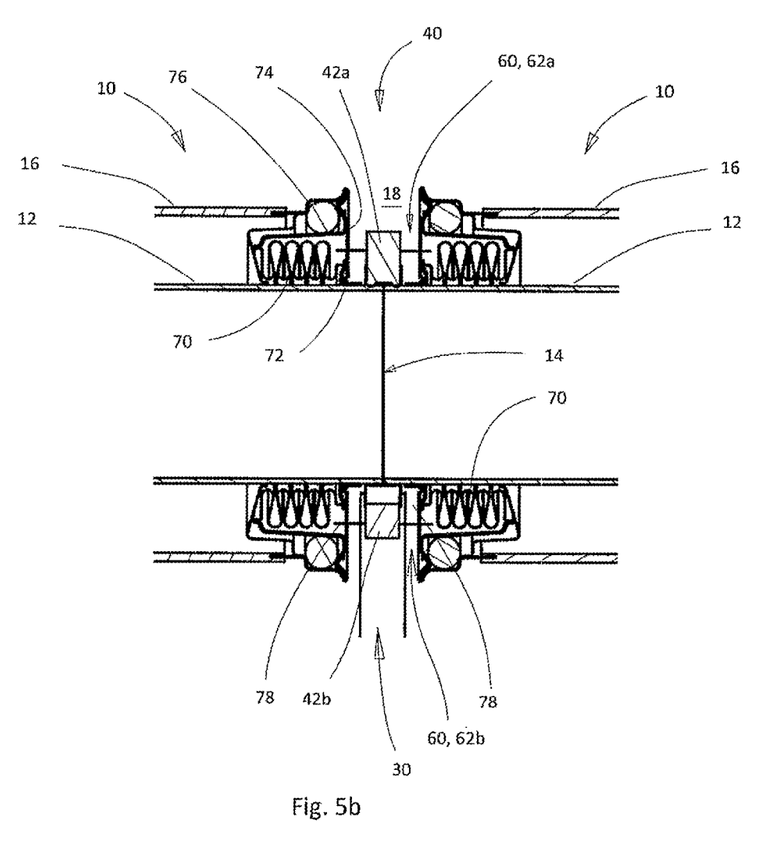

It can be seen in FIG. 2 that the glass cladding tube 16 is arranged in a recessed manner with respect to the ends 13a, b of the metal tube 12, so that a gap 18 is formed, which can be seen in more detail in FIG. 5a, b. The width $B_S$ is chosen such that the gap 18 between the glass cladding tube 16 is bridged by the thermal radiation shield 60 and the exposed ends 13a, b of the metal tube 12 are covered.

Figure 3:
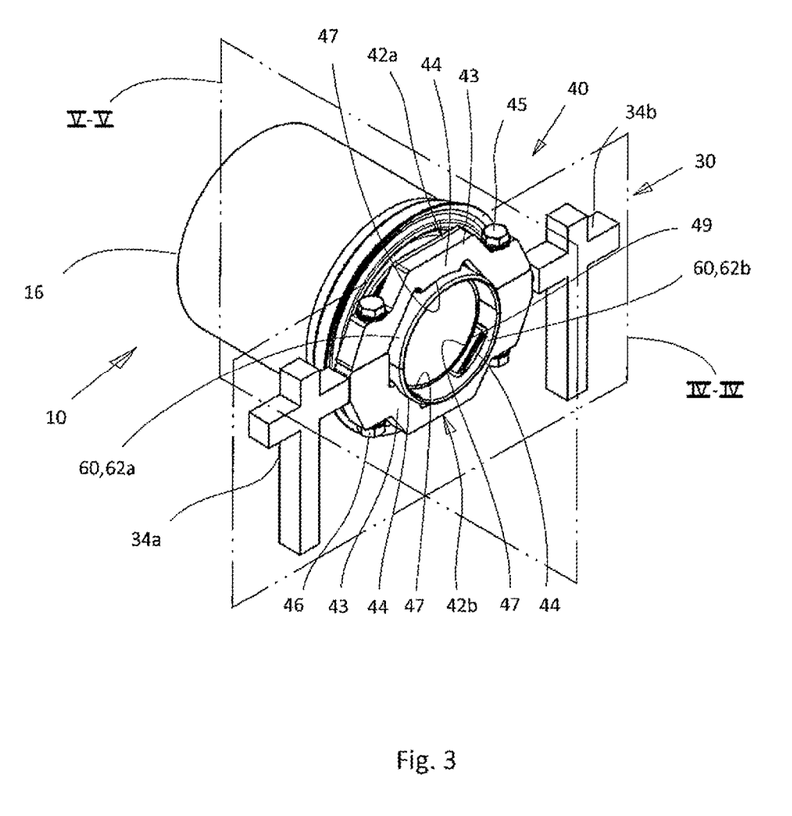

Illustrated in FIG. 3 is the retaining device 40 with the thermal radiation shield 60 in the assembled state. The thermal radiation shield 60 is arranged at a distance with respect to the main part 43 of the tube clamp halves 42a, b and at a distance with respect to the metal tube 12, so that, apart from the contact points at flat contact faces 47 of the retaining means 44, no thermal conduction from the metal tubes 12 can take place.

Figure 4:
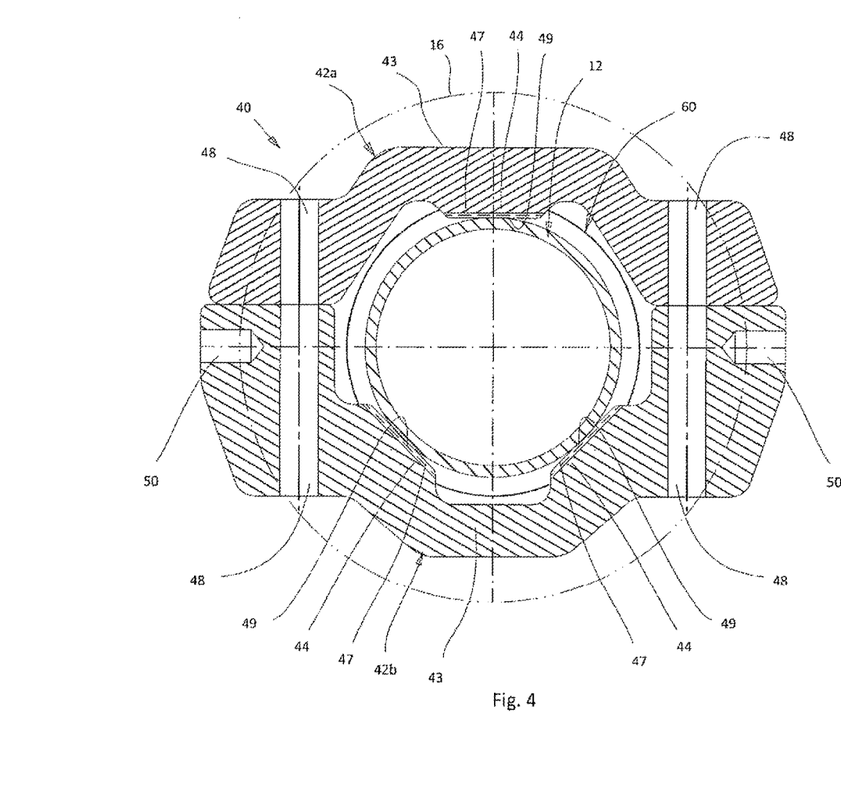

Illustrated in FIG. 4 is a section of the tube clamp 40, shown in FIG. 3, corresponding to the plane IV-IV.

The thermal radiation shield 60 is arranged at a distance with respect to the main parts 43 of the tube clamp 40 and is fixed in place by the retaining means 44. The retaining means 44 is designed as jaws having a flat contact face 47. The contact face 47 is oriented tangentially to the circumference of the metal tube, so that a point-like or linear support 49 is formed. As a result, the thermal conduction between the metal tube 12 and the tube clamp 40 will be minimized.

The lower tube clamp halve 42b has blind holes 50 for fastening it to the two retaining elements 34a, b of the support elements 32.

Illustrated in FIG. 5a is a first embodiment of the retaining device 30. FIG. 5a shows a section corresponding to the plane V-V of the tube clamp 40 illustrated in FIG. 3.

Arranged at the ends 13a, b of the metal tube 12 are expansion compensation devices 70 in the form of bellows, which are fastened by means of an annular disc 72 to the metal tube 12 and by means of a tubular fastening element 74 to a glass-metal transition element 76, which, in turn, is arranged at the glass cladding tube 16.

The gap 18 is defined by the distance between the annular discs 72.

The width $B_S$ of the thermal radiation shield 60 (see FIG. 2) corresponds to this distance, with the thermal radiation shield 60 not contacting the annular discs 72.

The heat that is radiated from the tube ends 13a, b of the metal tube 12 is reflected back by the thermal radiation shield 60 and is thus not lost.

The radius of curvature $R_M$ of the metal tube 12, the radius of curvature $R_W$ of the thermal radiation shield 60, and the radius of curvature $R_G$ of the glass cladding tube 16 are indicated.

In this embodiment, the thermal radiation shield 60 is arranged at a short distance from the metal tube 12, with $R_W \sim 1.15 \times R_M$.

Illustrated in FIG. 5b is another embodiment, in which the distance of the thermal radiation shield 60 from the metal tube 12 is markedly longer.

Created between the expansion compensation device 70 and the tubular fastening element 74 is an annular space 78, into which the thermal radiation shield 60 projects. This embodiment has the advantage that the tube ends 13a, b are shielded even better, because there is an overlap between the thermal radiation shield 60 and the annular disc 72. The annular discs 72 are arranged beneath the thermal radiation shield 60, as a result of which the thermal radiation losses can be reduced still further.

Figure 6:
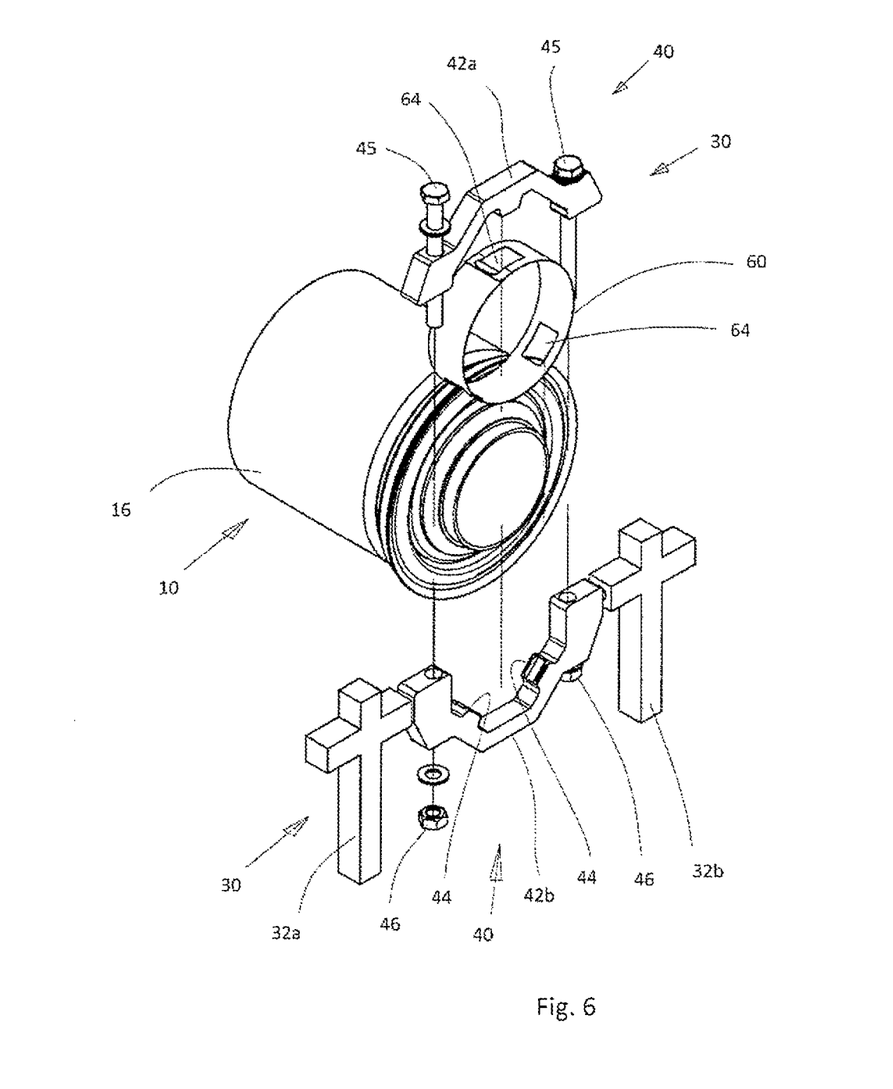

Illustrated in FIG. 6 is another embodiment of the thermal radiation shield 60, which is composed of a closed ring. The thermal radiation shield 60 has three openings 64 through which the retaining means 44 can engage. The retaining device 30 otherwise corresponds to that of FIG. 3.

Figure 7:
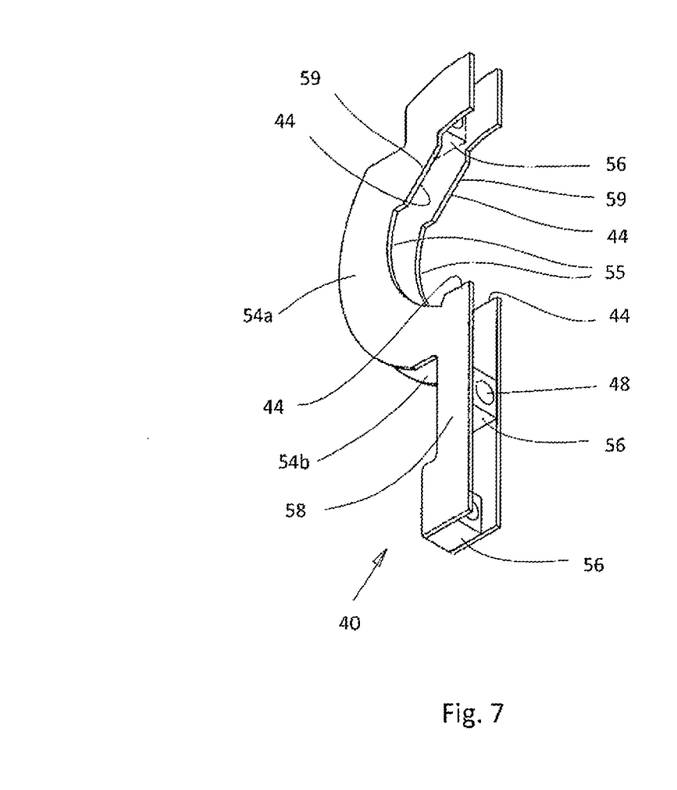
Figure 8:
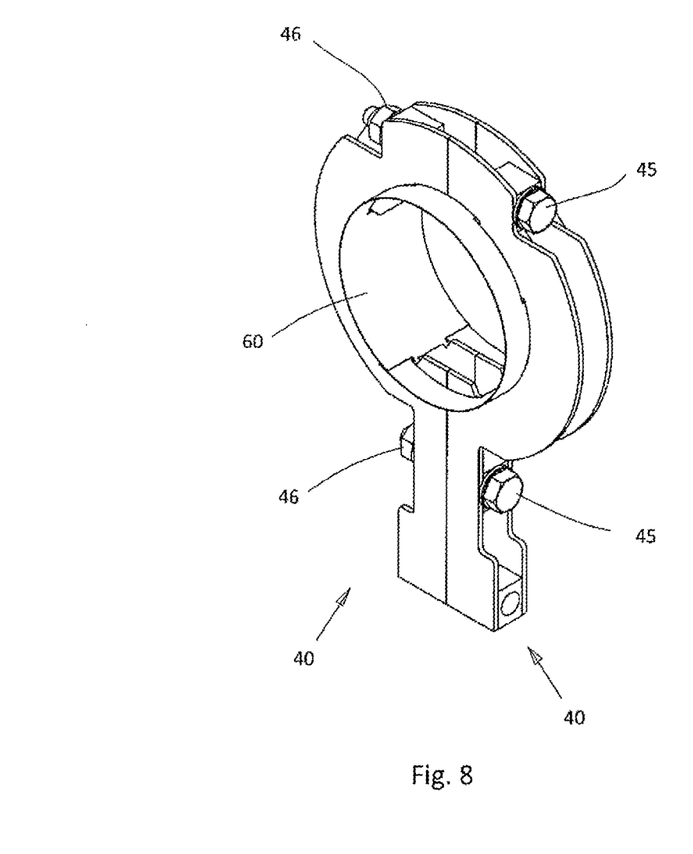
Figure 9:
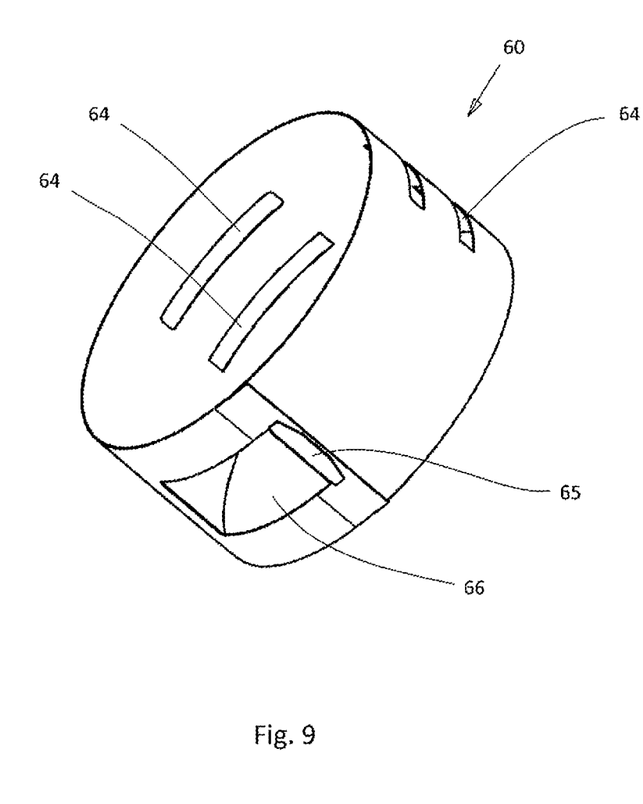

Illustrated in FIGS. 7-9 is another embodiment of the tube clamp 40, in which each tube clamp half 42a, b has two cut-out sheet metal blanks 54a, b, which are joined by way of a connection means 56. Each cut-out sheet metal blank 54a, b has a curved segment and an extension 58. The connection means 56 are preferably provided at the place where the connection screw bolts 45 are to be introduced. The connection means 56 are metal elements having a bored hole 48.

Each cut-out sheet metal blank 54a, b has, at its inner edge 55, at least one retaining means 44 in the form of a straight support segment, which, as in the embodiment of FIG. 3, ensures a point-like or linear support 59 at the metal tube 12.

FIG. 8 shows the assembled state of the tube clamp 40, on the inside of which, the thermal radiation shield 60, which is illustrated in perspective view in FIG. 9, is arranged. The thermal radiation shield 60 is designed as cylindrical annular strips, which have a retaining tab 65 at one end, which engages in a retaining opening 66.

As already shown in the embodiment according to FIG. 6, the thermal radiation shield 60 also has openings 64, in which the retaining means 44 engage. The openings 64 according to FIG. 9 are arranged in pairs and constructed as slits.

LIST OF REFERENCE NUMBERS 1 parabolic trough collector
2 parabolic trough
3 parabolic mirror
4 supports
5 focal line
10 absorber tube
12 metal tube
13a, b ends of the metal tube
16 glass cladding tube
18 gap
30 retaining device
32 support element
34a, b retaining element
40 tube clamp
42a, b tube clamp halves
43 main part
44 retaining means
45 screw bolt
46 nut
47 contact face
48 bored hole
49 support
50 blind hole
54a, b cut-out metal blank
55 inner edge
56 connection means
58 extension
59 support 60 thermal radiation shield
62a, b thermal radiation shield halves
64 opening
65 retaining tab
66 retaining opening
70 expansion compensation device
72 annular disc
74 tubular fastening element
76 glass-metal transition element
78 annular space
$B_S$ width of thermal radiation shield
$B_R$ width of tube clamp
$R_M$ radius of curvature of the metal rube
$R_W$ radius of curvature of the thermal radiation shield
$R_G$ radius of curvature of the glass cladding tube

What is claimed is:

1. A retaining device for an absorber tube, wherein the absorber tube has a metal tube and a glass cladding tube, the retaining device comprising:
    a tube clamp made of two tube clamp halves, the two tube clamp halves having a main part with a retaining feature and an inside, the tube clamp surrounding the metal tube in the mounted state with the retaining feature resting against an outside of the metal tube;
    a thermal radiation shield arranged on the inside of the main part, wherein the thermal radiation shield has a reflectance of 0.5 to 1.0 over the entire wavelength range of 0.5 µm to 30 µm, and wherein the thermal radiation shield is arranged at a distance with respect to the main part of the two tube clamp halves.

2. The retaining device according to claim 1, wherein the thermal radiation shield is made of a metal selected from the group consisting of stainless steel, aluminum, and an aluminum alloy.

3. The retaining device according to claim 1, wherein the thermal radiation shield extends over at least 50% of an inner periphery of the tube clamp.

4. The retaining device according to claim 1, wherein the thermal radiation shield has a width that is greater than a width of the tube clamp.

5. The retaining device according to claim 1, wherein the thermal radiation shield covers an entire free region of the metal tube.

6. The retaining device according to claim 1, wherein the thermal radiation shield has a one-part or multipart design.

7. The retaining device according claim 1, wherein the thermal radiation shield has a one-layer or multilayer design.

8. The retaining device according to claim 1, wherein the thermal radiation shield has openings, through which the retaining features engage.

9. The retaining device according to claim 1, wherein the retaining feature fixes the thermal radiation shield in place.

10. The retaining device according to claim 1, wherein the thermal radiation shield comprises at least one curved metal strip.

11. The retaining device according to claim 1, wherein the main part of the two tube clamp halves is fabricated from solid material.

12. The retaining device according to claim 1, wherein the retaining feature of the two tube clamp halves are contact jaws.

13. The retaining device according to claim 1, wherein the main part of the two tube clamp halves is fabricated in a frame construction manner.

14. The retaining device according to claim 13, wherein the main part is fabricated from at least two cut-out metal strip blanks that are arranged adjacently to each other in an axial direction of the tube clamp and are joined by a connector.

15. The retaining device according to claim 14, wherein the retaining feature of the cut-out metal strip blanks are support segments.

16. An absorber tube arrangement, comprising:
    two absorber tubes, each of which has a metal tube and a glass cladding tube, wherein the two metal tubes are joined to each other, and there is a gap between the glass cladding tubes, and
    a retaining device that engages the joined metal tubes in the gap, the tube clamp made of two tube clamp halves, wherein the two tube clamp halves have a main part with a retaining feature and an inside, the tube clamp surrounding the metal tube in the mounted state with the retaining feature resting against an outside of the metal tube, wherein the retaining device includes, on an inside of the main part of the tube clamp, a thermal radiation shield, wherein the thermal radiation shield has a reflectance of 0.5 to 1.0 over the entire wavelength range of 0.5 µm to 30 µm, and wherein the thermal radiation shield is arranged at a distance with respect to the main part of the tube clamp halves and at a distance with respect to the metal tubes.

17. The arrangement according to claim 16, wherein the thermal radiation shield has a first radius of curvature that is smaller than a second radius of curvature of the glass cladding tube.

18. The arrangement according to claim 17, wherein the first radius of curvature is greater than a third radius of curvature of the metal tube.

19. The arrangement according to claim 17, wherein the first radius of curvature is between or equal to 1.1 to 1.3 times the third radius of curvature.

20. The arrangement according to claim 16, wherein the thermal radiation shield has a width that is chosen such that the gap between the two cladding tubes is bridged.

21. The arrangement according to claim 16, wherein the thermal radiation shield extends over at least 50% of a periphery of the metal tube.

22. The arrangement according to claim 16, wherein the thermal radiation shield has a reflective design at least on the side facing the metal tubes.

23. The arrangement according to claim 16, wherein the thermal radiation shield extends in each case into an annular space between the metal tubes and an expansion compensation device of the absorber tube.

* * * * *